United States Patent [19]
Hehl

[11] Patent Number: 5,700,502
[45] Date of Patent: Dec. 23, 1997

[54] INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 313,871

[22] Filed: Sep. 28, 1994

[30] Foreign Application Priority Data

Sep. 30, 1993 [DE] Germany .................. 43 33 365.6
Apr. 2, 1994 [DE] Germany .................. 44 11 649.7

[51] Int. Cl.⁶ .................................................. B29C 45/36
[52] U.S. Cl. .................. 425/589; 425/595; 425/450.1; 425/451.9; 100/258 A; 100/231
[58] Field of Search .................... 425/589, 595, 425/450.1, 451.9; 100/258 A, 231

[56] References Cited

U.S. PATENT DOCUMENTS

| | | | |
|---|---|---|---|
| 4,222,731 | 9/1980 | Enrietta et al. | 425/592 |
| 4,345,893 | 8/1982 | Prince | 425/595 |
| 5,332,385 | 7/1994 | Leonharsberger | 425/589 |
| 5,354,196 | 10/1994 | Ziv-Av | 425/589 |
| 5,454,709 | 10/1995 | Leonhartsberger et al. | 425/589 |
| 5,633,024 | 5/1997 | Ziv-Av | 425/589 |

FOREIGN PATENT DOCUMENTS

| | | |
|---|---|---|
| 0 504 580 | 9/1992 | European Pat. Off. . |
| 0 554 068 | 8/1993 | European Pat. Off. . |
| 0 620 095 | 10/1994 | European Pat. Off. . |
| 37 22 340 | 1/1989 | Germany . |

*Primary Examiner*—Thomas R. Weber
*Attorney, Agent, or Firm*—Spencer & Frank

[57] ABSTRACT

An injection molding machine for processing plastifiable materials includes a positioning element, a stationary mold carrier fixedly connected therewith, a movable mold carrier defining a mold tentering space with the stationary mold carrier, a closing device for shifting the movable mold carrier in a closing direction into a closed position with the stationary mold carrier, a supporting element for the closing device movably carried by the positioning element, and a clamping unit jointed to the stationary mold carrier and the supporting element at coupling points and adapted to essentially take up occurring forces and deformations and to deviate them around said mold tentering space. The clamping unit is formed of several pieces jointed to the stationary mold carrier or the supporting element at the coupling points and are coupled with each other at at least one first connecting point spaced from the coupling points.

22 Claims, 13 Drawing Sheets

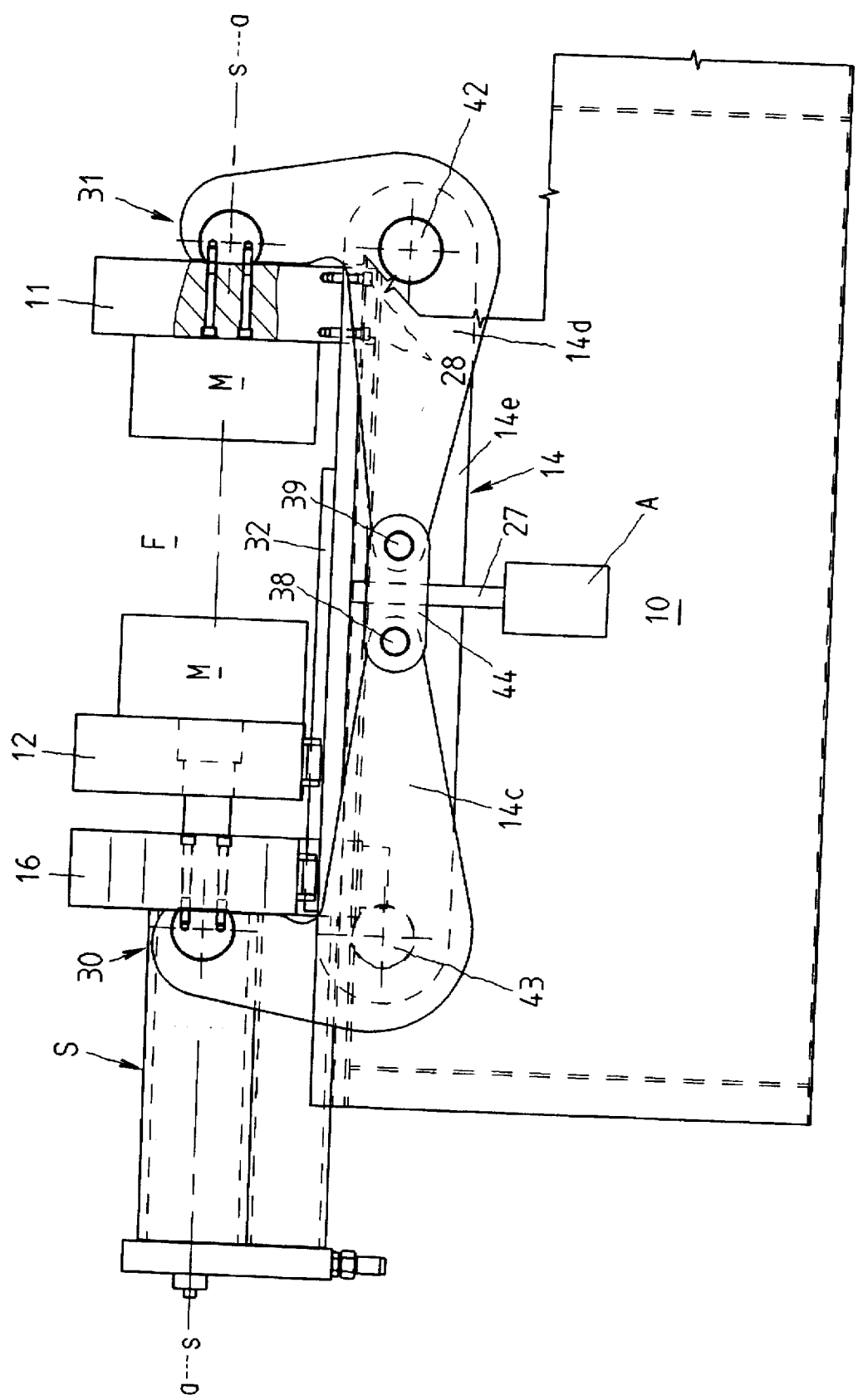

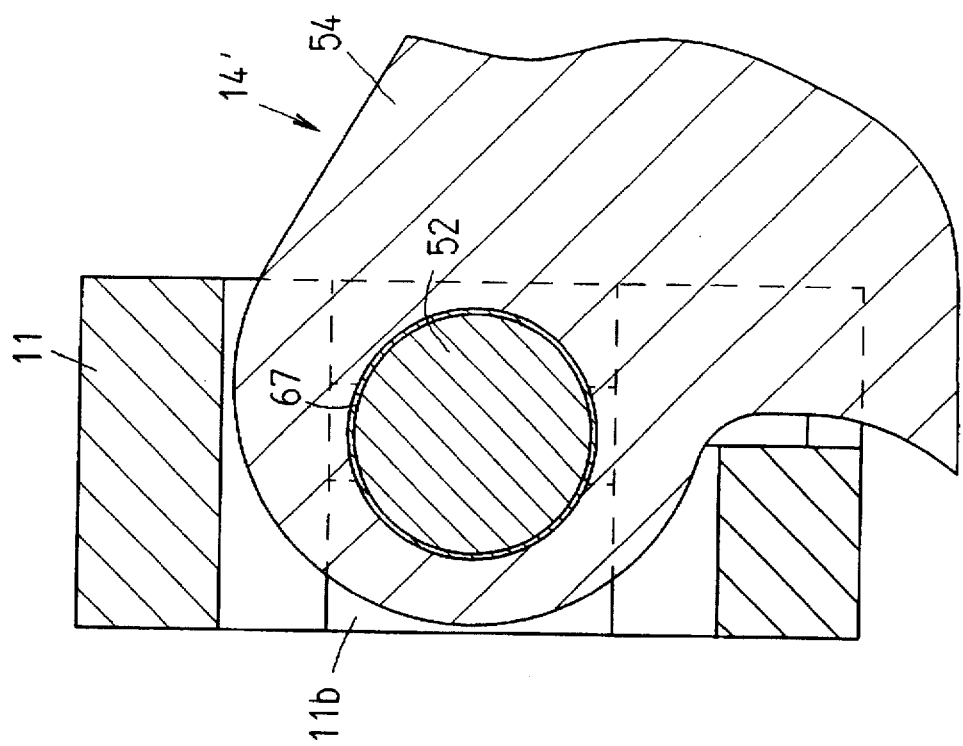
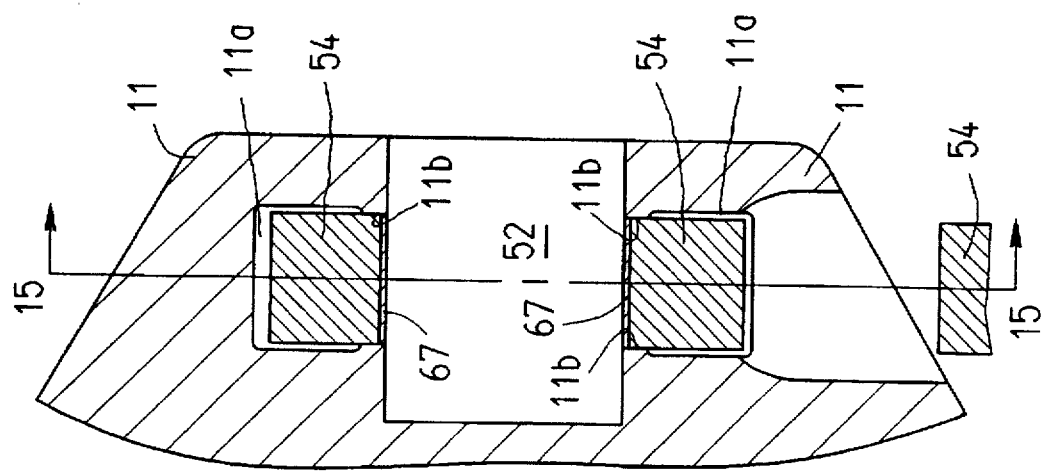

INJECTION MOLDING MACHINE FOR PROCESSING SYNTHETIC MATERIALS

BACKGROUND OF THE INVENTION

1. Field of the Invention

This invention relates to an injection molding machine for processing plastifiable materials, such as plastics, ceramic masses and the like, comprising a positioning element, a stationary mold carrier fixedly connected with the positioning element, a movable mold carrier constituting a mold tentering space together with the stationary mold carrier between the movable mold carrier and the stationary mold carrier, a closing mechanism adapted to transfer the movable mold carrier into and out of a closed position with the stationary mold carrier, a supporting element for the closing mechanism movably beared on the positioning element in a closing direction and a clamping means hinged at several coupling points in a region of the stationary mold carrier and in a region of the supporting element and adapted to essentially take up forces and deformations and to deviate them around the mold tentering space.

2. Description of the Prior Art

An injection molding machine of this kind is known from European Published Patent Applications 504 580 and 554 068. In these injection molding machines a clamping means is provided, which deviates the forces around the mold tentering space. The movable mold carrier is supported on guiding elements arranged on top of the machine base. The clamping means on one side is joined with the stationary mold carrier, and on the other side with a supporting element for the closing device of the movable mold carrier. Thus, the forces occuring during mold closure are not deviated into the machine base, but are absorbed by the clamping means, causing a deformation of the clamping means. The clamping means in this arrangement are, however, big and unmanageable, so that transport costs, especially for shipments into overseas countries, are relatively high and thus represent a considerable cost factor. Furthermore, the clamping means are directly coupled at the sides of the mold carriers, so that it is difficult to obtain mold parallelism, due to lack of adjusting possibilities. These parts show first signs of wear at the coupling points after 1 to 10 million load cycles, and since no separate joints are provided, it is necessary to exchange the mold carrier, the supporting element and the clamping means as well. A division of the clamping means into several pieces is not planned and not intended. In another machine known from U.S. Pat. No. 4,345,893, the clamping means provided according to the same principle as those used in European Published Patent Application 554 068, encompass the mold carriers and the supporting element for one closing direction. In this case, however, the clamping means are arranged swivelling in the region of the stationary mold carrier, so that they do not represent a hindrance when the mold is exchanged. When the clamping means are swivelled backwards, the stationary mold carrier and the supporting element get in contact, thus constituting a closed force frame. Since the clamping means are formed as hollow frames, a lateral access to the mold is certainly possible, but still the access is not completely free transversally at the top. The rest at the force frame is merely produced by bearing surfaces, without further joints being provided.

U.S. Pat. No. 4,222,731 discloses a machine in which the stationary and the movable mold carrier are connected with each other via a lever system. The lever system comprises two levers arranged in a vertical position and one horizontally disposed longitudinal carrier, which is jointedly connected with the levers. A further connection element, formed by a piston-cylinder-unit, is located opposite to the longitudinal carrier and in a larger distance from the closing axis. At the movable mold carrier a lever is coupled, which moves the movable mold carrier axially into the closing direction via a second piston-cylinder-unit and which is designed for closing the mold. After the mold has been closed, the piston-cylinder-unit arranged at the lower end of the levers is used for generating the required closing force. The length of the levers required for the generation of forces is limited due to the construction height of the machine base.

German Published Application 37 22 340 discloses a machine wherein a clamping means is provided similar to that of U.S. Pat. No. 4,345,893. Additionally, this machine comprises engageing means for engageing the movable mold carrier in dependency of the movement of the closing device. Even if the clamping means consists of several parts, the engageing means does not constitute a part of the force frame for the deviation of forces during mold closure or of the driving mechanism. Furthermore, an exchange of joint parts is not possible.

SUMMARY OF THE INVENTION

It is an object of the invention so to provide an injection molding machine for processing plastifiable materials, which is of the kind described first hereinbefore and to create an easily manageable clamping means for it, which can be adapted in a simple way to the different injection molding requirements.

That object is accomplished in accordance with the invention in that the clamping means comprises several pieces and in that the pieces of the clamping means are jointedly connected with the stationary mold carrier or the supporting element at the coupling points and are coupled with each other at least at one first connecting point lying in some distance from the coupling points.

The clamping means comprising several individual pieces, among others, offers the advantage that the total weight of the clamping means can be divided into fractional weights for each individual element. To ship compact individual pieces instead of whole clamping means is much easier, above all if shipments into far countries are concerned. This becomes especially apparent, if previously sold injection molding machines are retrofitted with the clamping means in the course of retrofit-actions. The division of the clamping means into several pieces has the further advantage that the individual pieces can be made of burning blanks. This means that by putting the individual pieces close together, the material can be largely utilized in plates, at least with respect to geometries.

Finally, the multipart clamping means creates the constructional conditions for an actively movable force frame in which the pieces are movable against each other. This movement is realizable since one piece extends parallel to the other piece in the closing direction between the mold carriers, but it is also conceivable to lengthen the second piece into the opposite direction, for example, until under the injection molding unit or to merely extend it to that point, in order to there provide a further driving unit, if necessary.

According to a preferred embodiment, the pieces of the clamping means are detachably connected at a second connecting point and are movable around the first connecting point, which is arranged in some distance from the coupling points, against one another, if the connection at the second connecting point is loosened. A connecting pin forms a swivelling axis at the first connecting point and the pieces of the clamping means are movable against one another by a driving device. In such an arrangement the individual pieces act as prolonged levers as defined by U.S. Pat. No. 4,222,731. In comparison, however, the levers are only turned towards the inside. Whereas the length of levers placed only in vertical position is limited by the height of the machine base, an arrangement of the levers in the closing direction permits an increase in the length of the levers to an extent the machine size and their respective mold tentering spaces are increased, practically resulting in an self-adaptation to higher forces, especially if the required closing force is to be generated by the driving device via the lever.

BRIEF DESCRIPTION OF THE DRAWINGS

FIG. 7 is a view according to FIG. 1 of a second embodiment.

FIG. 14 is an enlarged partial, sectional view in the region of the bearing of the clamping means at the stationary mold carrier according to line 14—14 of FIG. 8.

FIG. 15 is a section according to line 15—15 of FIG. 14.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 1:
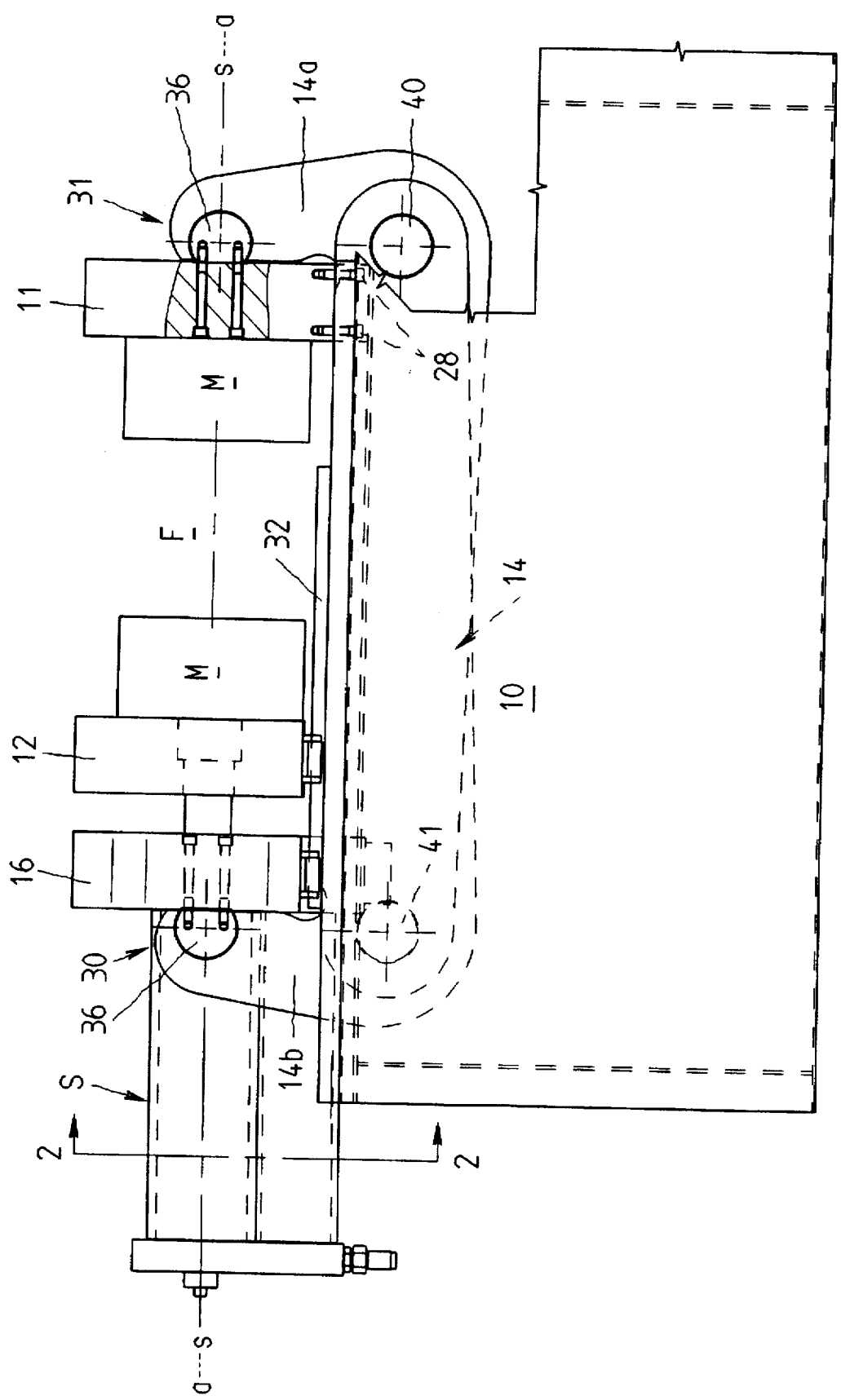
FIG. 1 shows a mold closing unit of an injection molding machine in a side view of a first embodiment.

FIGS. 1 and 7 show the mold closing unit of an injection molding machine, which serves for processing plastifiable masses, such as thermoplastic plastics, ceramic masses, powdered injection molding compounds and the like. The injection molding machine comprises a positioning element 10 or a machine base, on which any drivable closing mechanism S for displaceing a movable mold carrier 12 into and out of a closed position with a stationary mold carrier 11 is arranged. The stationary mold carrier is fixedly connected with the positioning element 10 by screws 28. Besides, the mold closing unit is axially movable on the positioning element 10 in a closing direction. According to FIG. 1 the supporting element 16 and the movable mold carrier 12 are slideable on a guide bead 32.

One of the end sections of a clamping means 14 is linked at a first coupling point, formed by a joint 31, in a region of the stationary mold carrier 11 and the other end section is linked at a second coupling point, formed by a joint 30, in a region of the supporting element 16. The clamping means nearly alone takes up essentially the forces and deformations occuring when the mold is in a closed position. In order to keep the mold tentering (clamping) space F free for placing the mold M, the clamping means is formed in such a way that it deviates the forces around the mold tentering space F clamped between the mold carriers.

Figure 2:
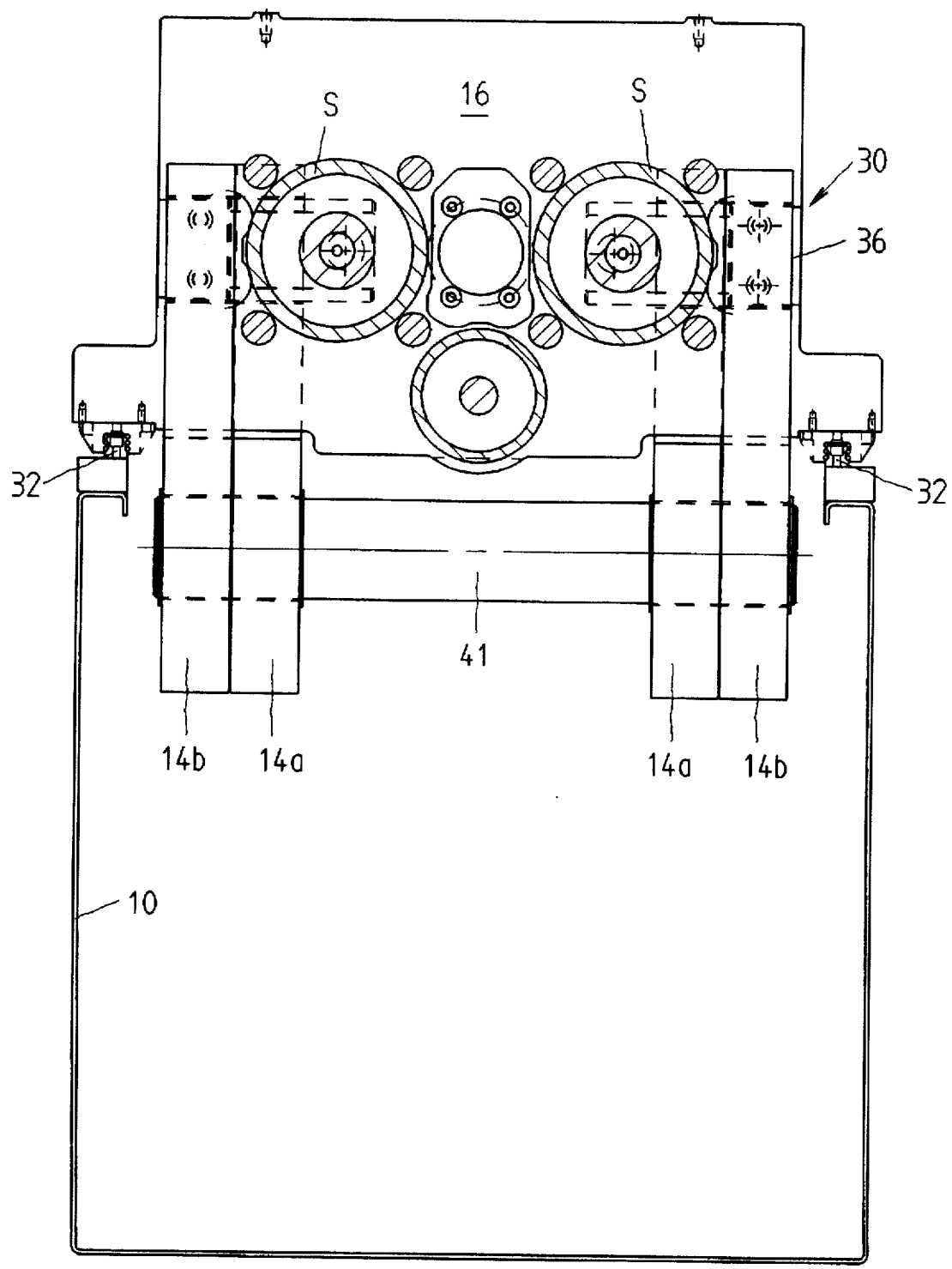
FIG. 2 is a view according to line 2—2 of FIG. 1.
Figure 3:
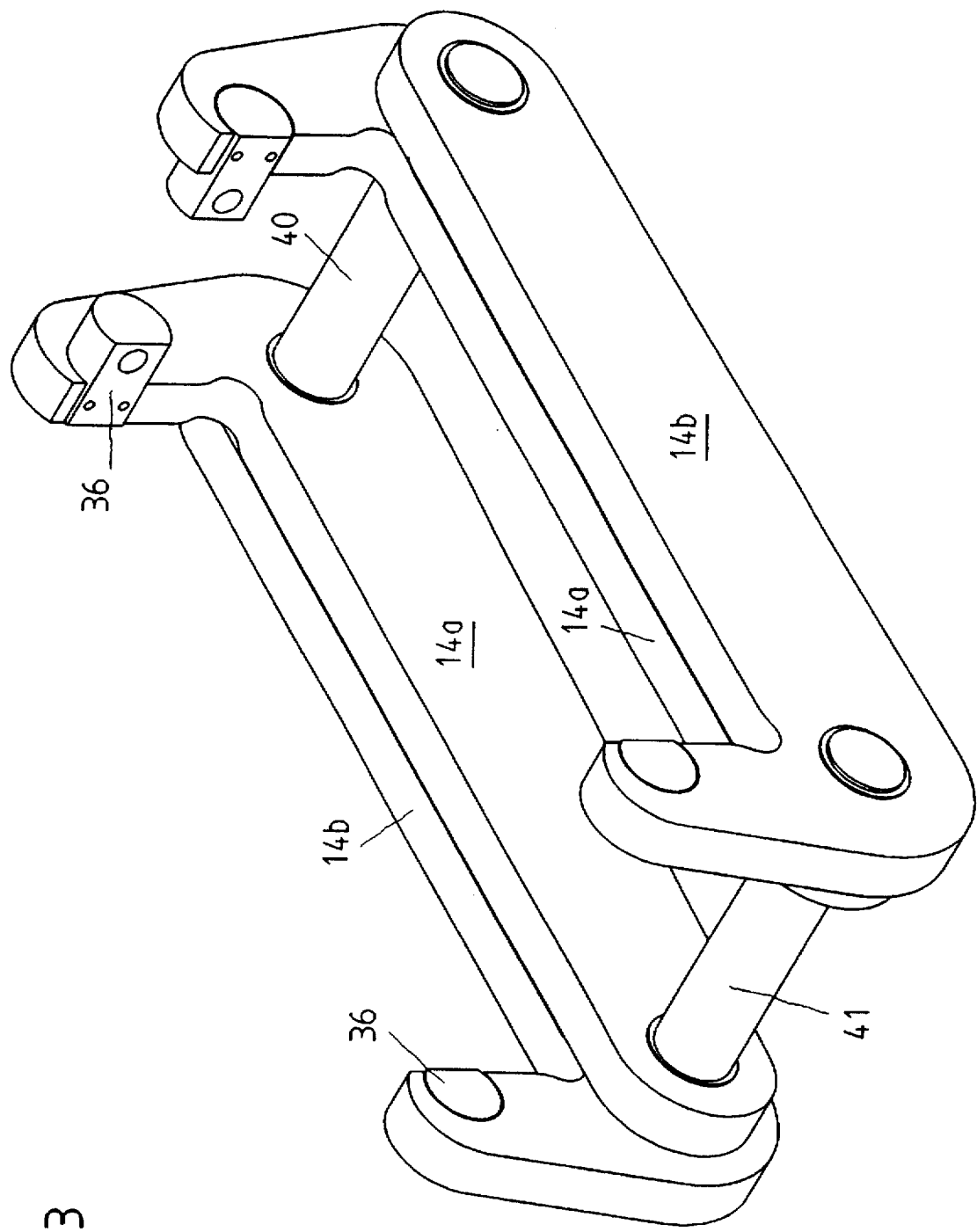
FIG. 3 is a three-dimensional representation of the clamping means detached from the injection molding machine according to the present invention, constituting a rigid force frame.

The clamping means 14 itself comprises several pieces. The first embodiment (FIGS. 3 and 4); includes the pieces 14a, 14b. The second embodiment includes first pieces 14c, 14d lying on the outside, and the center piece 14e (FIG. 7). The pieces are partially arranged side by side and partially overlap in a view turned vertically towards the closing directions s—s. The individual pieces are coupled with each other at at least one connection point between the ends of the clamping means. This first connection point is formed by the connecting pin 40 in the first embodiment, (FIGS. 1 and 3) and by the bearing element 44 in the second embodiment, (FIG. 7) and is located in some distance of the coupling points. The pieces 14a, 14b or the first pieces 14c,14d of the clamping means 14 are, for example, linked at a coupling point and are furthermore supported, for example, at another point. In FIG. 3 this point is a connecting pin 41. In this arrangement the connecting pins are connected with each other and thus constitute a rigid frame, in which both pieces 14a, 14b are supported inside the clamping means. In that region in which the moment load is the highest one, the pieces are arranged side by side in order to reduce the deformations occuring. The clamping means is arranged on two sides of the closing device S, symetrically to a vertical plane laid through the closing axis a—a. At least two pieces of the clamping means 14 are provided on each side of the closing device S as shown in FIG. 2.

Figure 4:
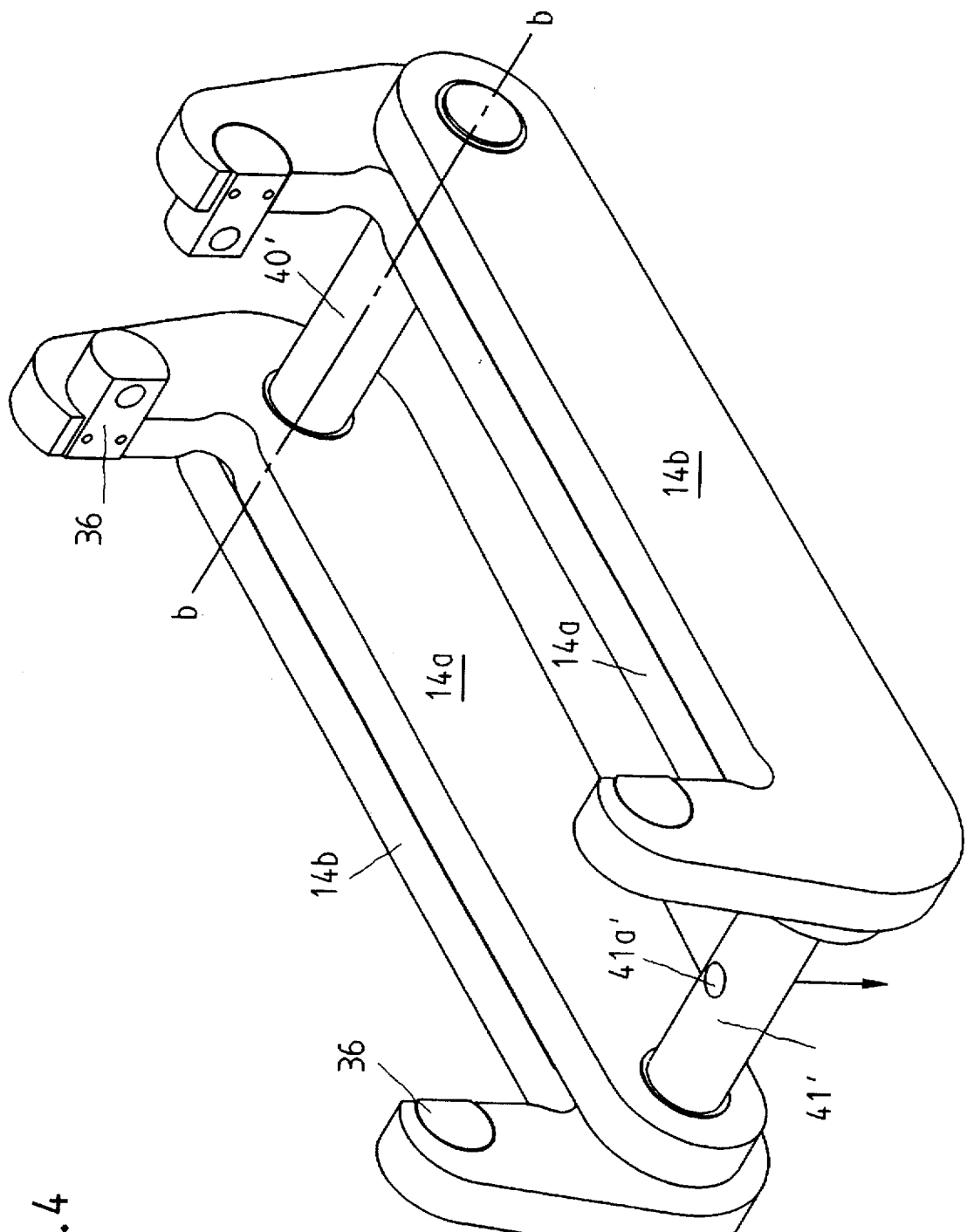
FIGS. 4,5 is a representation according to FIG. 3 of an actively movable clamping means.
Figure 5:
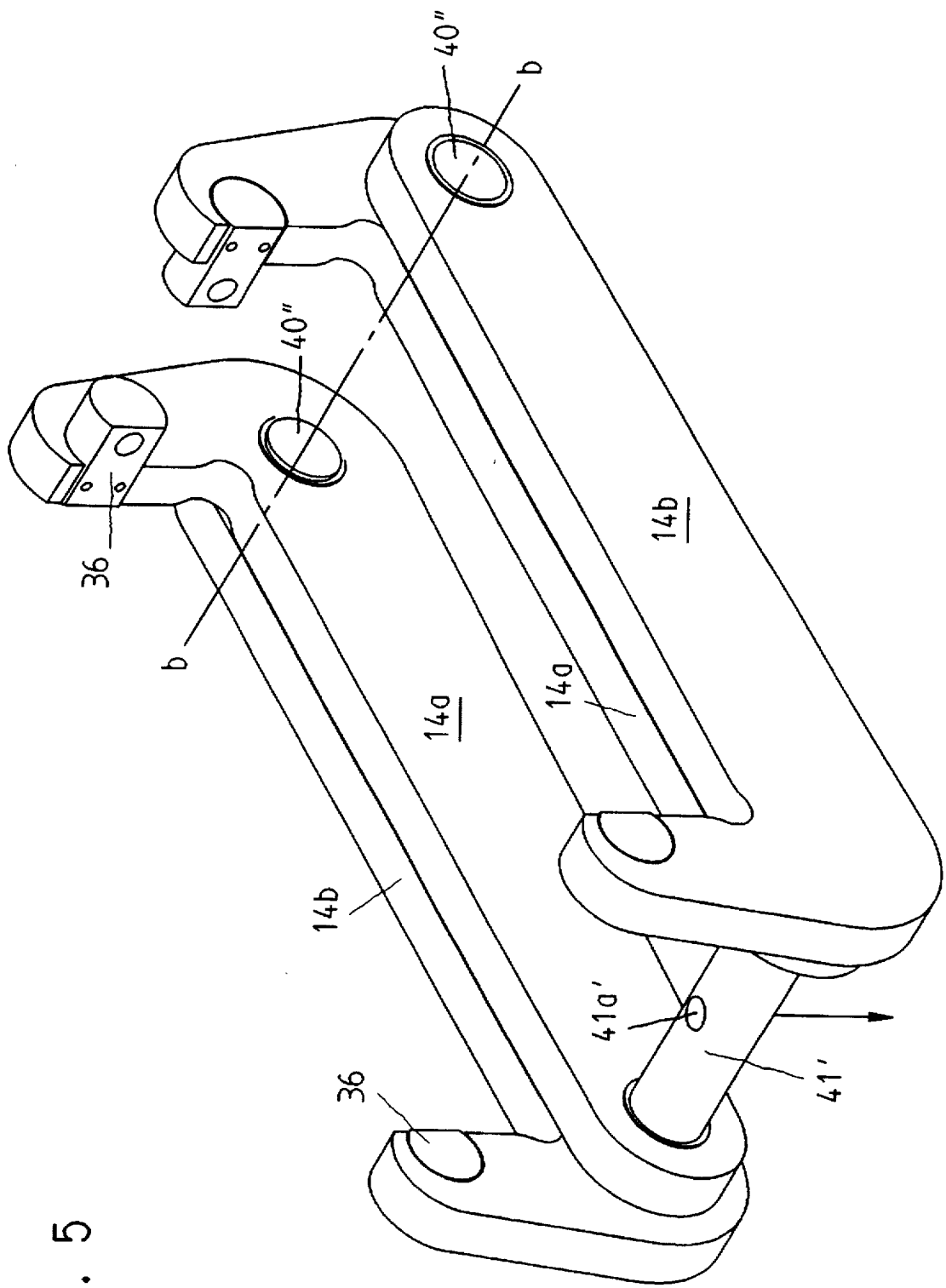

Basically the clamping means shown in the FIGS. 4 and 5 and the one represented in FIG. 3 are of a comparable formation. The differences are that the detachable connection by the connecting pin 41 represented in FIG. 3 is in the structure of FIGS. 4 and 5 replaced by connecting pins 41', which on the further point only penetrate the inner parts. This way it is possible to move equivalently actuating pieces, as are the pieces 14b of the clamping means 14, commonly. Also referring to FIG. 1, the supporting element 16 and the stationary mold carrier 11 are linked in the region of the hinge bolts 36. The driving device A can then be attached, for example, with a spindle or a piston rod in the region of the opening 41a'. Due to the long lever arm a high closing force can be reliably generated by a movement in a direction of the arrow. Even if it is not important which drive type is chosen for the driving device, it is preferred that in this case the force be generated by an electrically actuated spindle drive.

FIG. 4 differs from FIG. 5 in that the continuous connecting pin 40', which in case necessary passes also through the machine base, is replaced by two short connecting pins 40". Nevertheless, in both cases these connecting pins form a swivelling axis b—b around which the lever 14a is movable when the driving device is actuated.

In FIG. 7, the second embodiment of the injection molding machine is represented. The first pieces 14c, 14d located on the outside are connected at the joints with the supporting element and the stationary mold carrier, respectively. In the center they are linked with the joints 38 and 39 via the bearing element 44. In order to keep the two first pieces 14c,14d located on the outside in a determined distance, they are conjoined at the connecting pins 42, 43, with the center piece 14e, which this way keeps the first pieces 14c, 14d indirectly at a determined distance. Driving device A is provided at the bearing element 44, which sets a spindle 27 running when it is actuated, so that the bearing element 44 is moved downwards and thus the closing force is generated. The driving device can be either supported by the positioning element or it is also possible to support the spindle at the center piece 14e, so that no further deformations are lead into the machine base.

Figure 6:
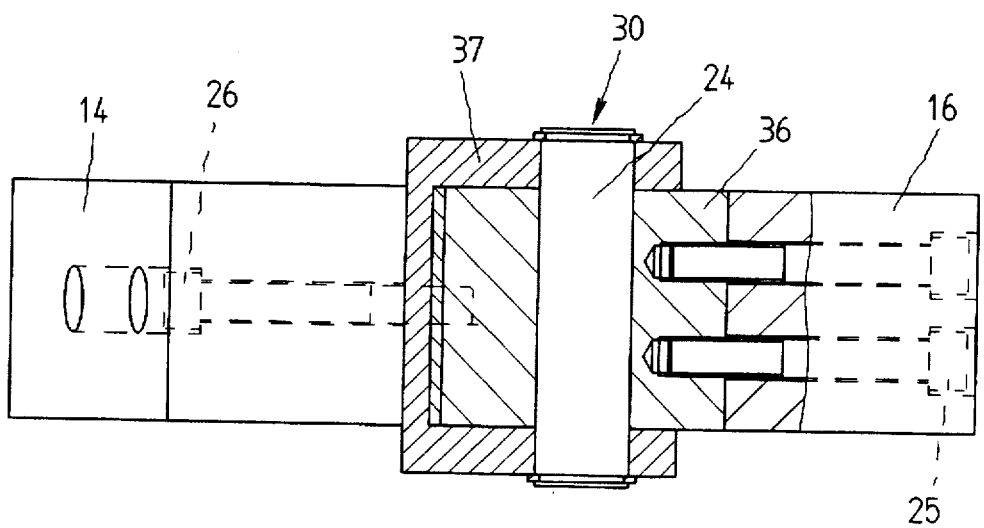
FIGS. 6,6a is a sectional view through a joint with and without washer piece according to the invention.
Figure 6A:
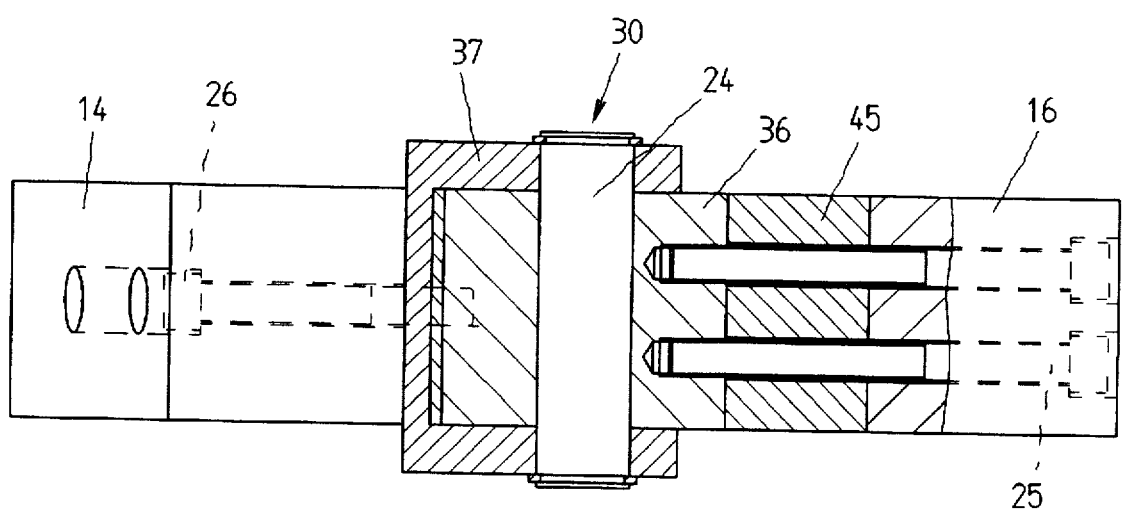

The joints 30, 31 used in the first and second embodiments are of a similar type (FIGS. 6, 6a). The coupling points are basically linked on those sides of the mold carriers 11, 12 and the supporting element 16 which are opposite to the mold tentering space F. That way it is possible to reduce the bending stress of the supporting element and the mold carriers. The joints comprise socket joints 37 and hinge bolts 36, which are turnable around the bearing studs 24. The joint pieces are conjoined with the pieces to be connected jointedly by screws 25, 26, which makes possible an easy adjustment of the mold parallelism. Since the joints can be exchanged in any way, wear at the clamping means 14,14', the stationary mold carrier 11 or the supporting element 16 can be avoided (FIGS. 6,6a). Furthermore it is possible to insert washer pieces 45 between the joint pieces and the pieces of the clamping means 14, or the respective supporting element 16 and the stationary mold carrier 11, in such a way that the distance between the mold carriers is easily changeable, so that smaller mold dimensions can be considered, if necessary.

Figure 8:
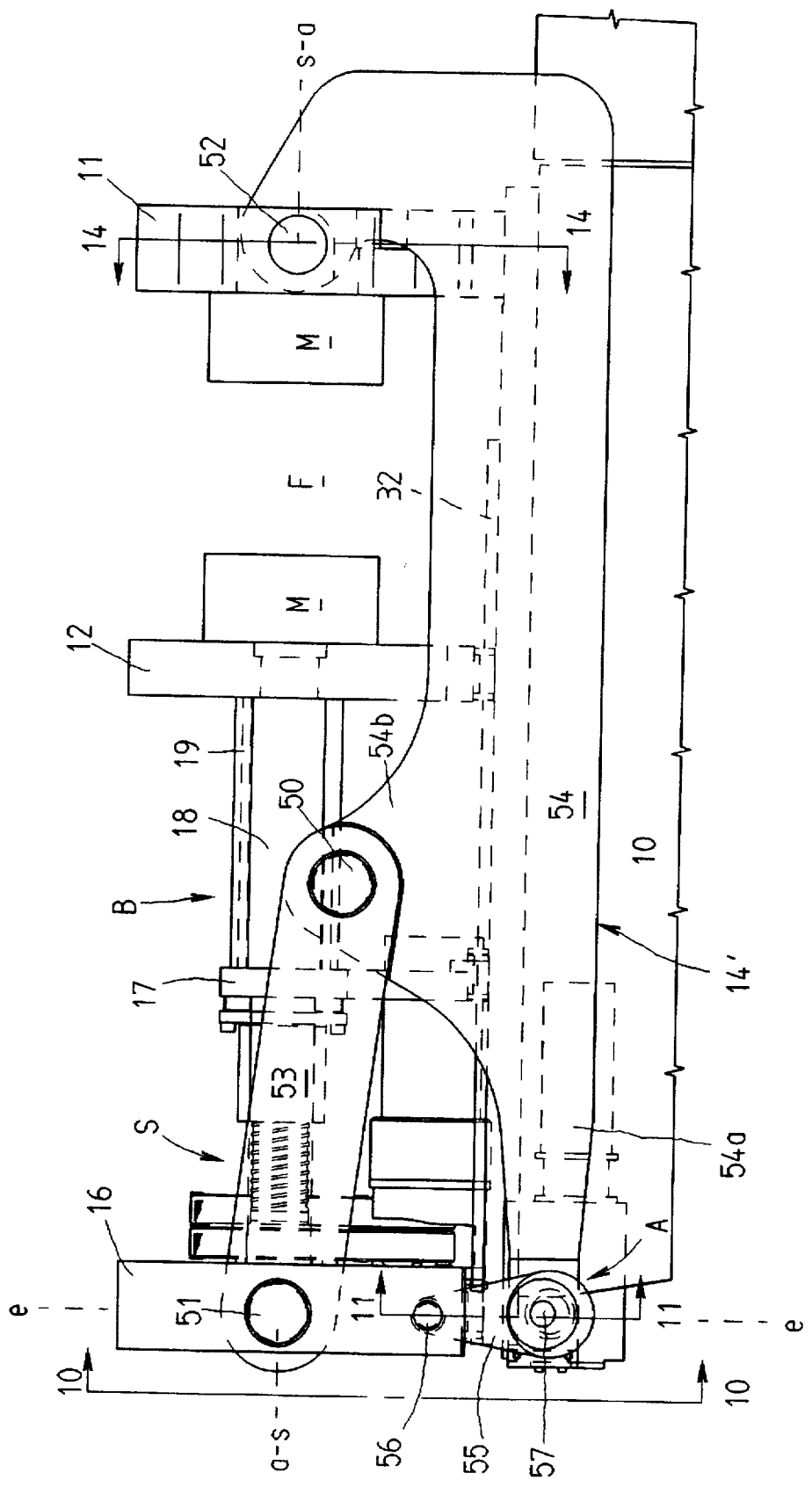
FIG. 8 is a view according to FIG. 1 of a third embodiment with an actively movable clamping means.
Figure 9:
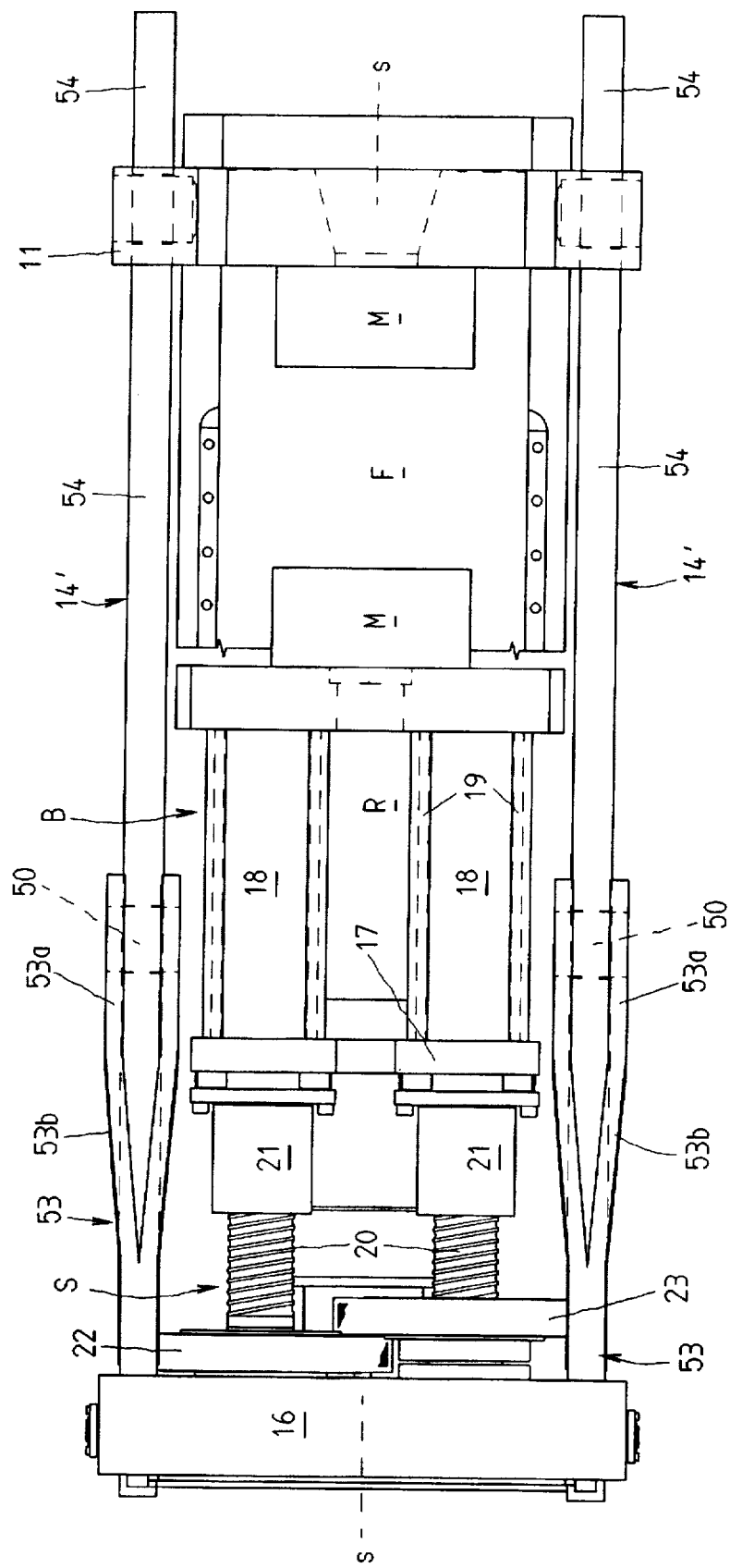
FIG. 9 is a top view of the mold closing unit according to FIG. 8.
Figure 10:
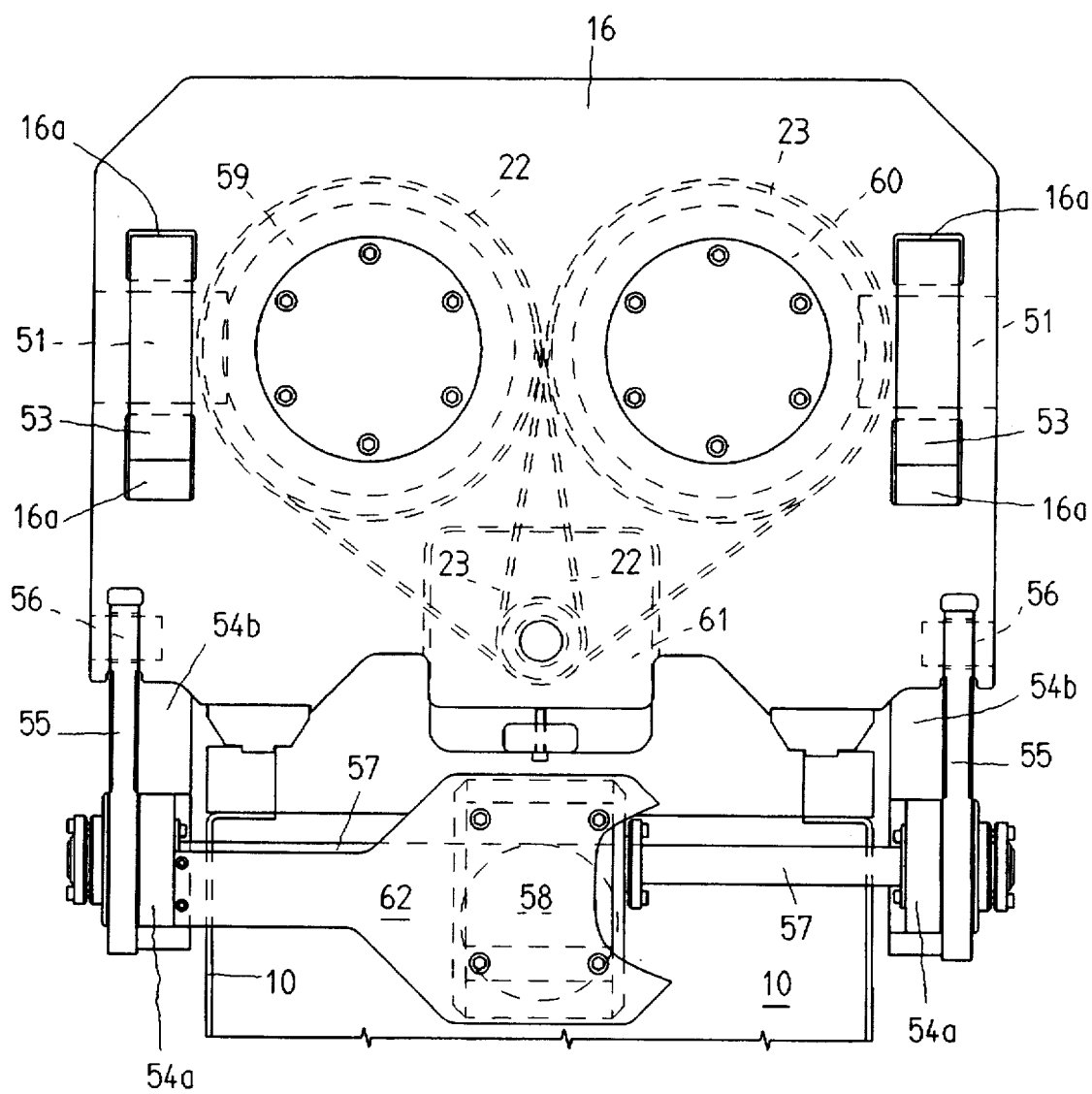
FIG. 10 is a view of the mold closing unit according to line 10—10 of FIG. 8.
Figure 12:
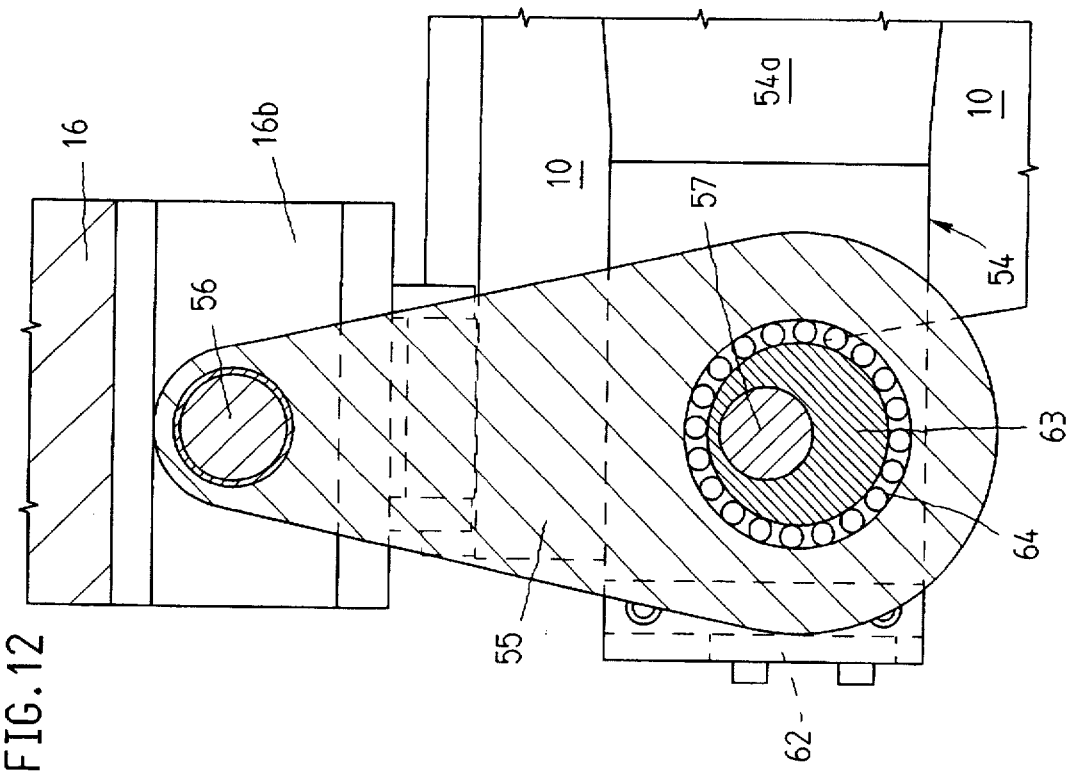
FIG. 12 is a sectional view according to line 12—12 of FIG. 11.
Figure 11:
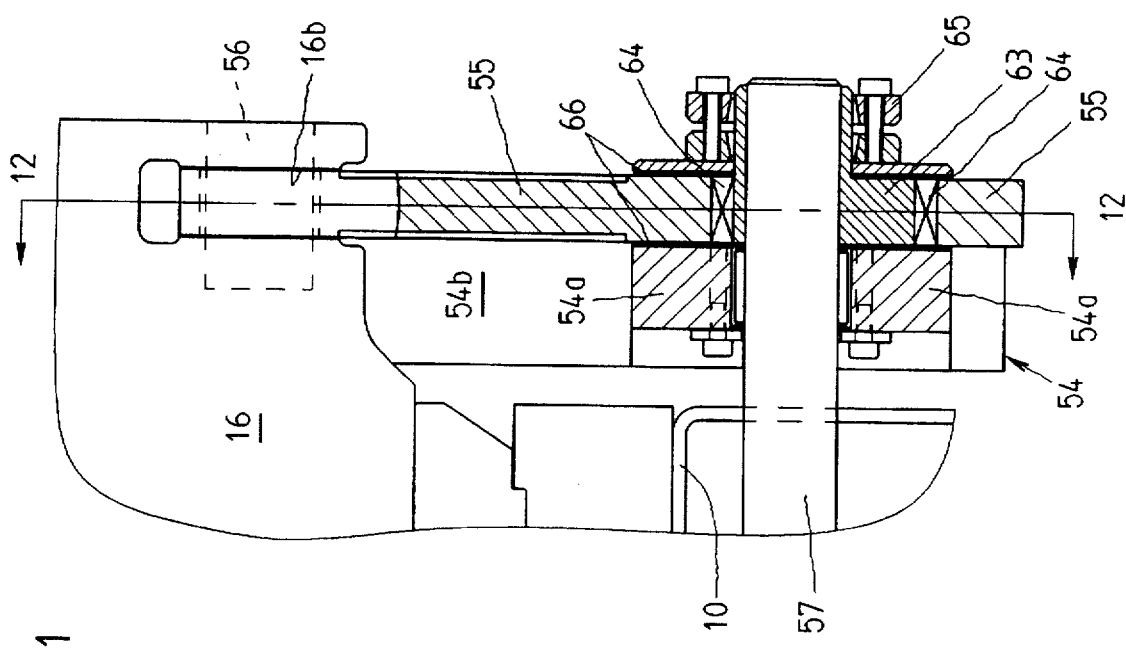
FIG. 11 is an enlarged, partially sectional view in the region of the driving device according to line 11—11 of FIG. 8.

FIGS. 8 to 15 show a third embodiment in which the relatively closed and to a large extent overlapping form of the clamping means of the other embodiments has been removed in order to obtain a better force transmission. That way the movement required for the linear movement of the movable mold carrier is decoupled from the movement required for generating the closing force. This movement is effected via a "lying" toggle, which when it is moved generates the closing force. Again, the closing force is generated actively inside the clamping means. To start with, however, this mold closing unit is constructed largely identically as the ones explained up to this point. Thus, as shown in FIG. 8, the movable mold carrier 12 is transfered into and out of a closed position with the stationary mold carrier 11 via a closing mechanism. Also referring to FIG. 9, the movable mold carrier 12 is part of a moving unit B, comprising a bearing element 17 for the spindles 20 of a spindle mechanism, tubes 18 for receiving the spindles and tension rods 19, which clamp the bearing element 17 with the movable mold carrier 12. The whole moving unit is guided on the guide bead 32 via several guidings, which ensures its precise bearing. Nuts 21 fixed at the bearing element 17 are in contact with the spindles 20. As shown in FIG. 10, the spindles are coaxially lead by pulleys 59,60 via the belts 22,23, which are driven by a driving motor 61. Between the tubes 18 there is enough space R left (FIG. 9) to provide an ejection unit. Alternatively, it is also possible to provide other kinds of drive, such as, for example, toothed-gearings.

Reverting to FIG. 8 in the region of the stationary mold carrier 11 the clamping means 14' is linked via the hinge bolt 52 and in the region of the supporting element 16 via the hinge bolt 51. Clamping means 14' comprises a bracket 53 and a claw-shaped piece 54, which are interconnected by a connecting pin 50. The connecting pin 50 and the hinge bolt 52 are positioned, more or less to the left and to the right of the mold tentering space F. Seen from the direction of the stationary mold carrier, the claw-shaped piece 54 has an end section 54a which extends past the connecting pin 50. This end section is a favorable point for connecting a driving device A for generating the closing force, since in this area only a part of the force, which acts in the region of the mold as closing force, has to be generated.

Figure 13:
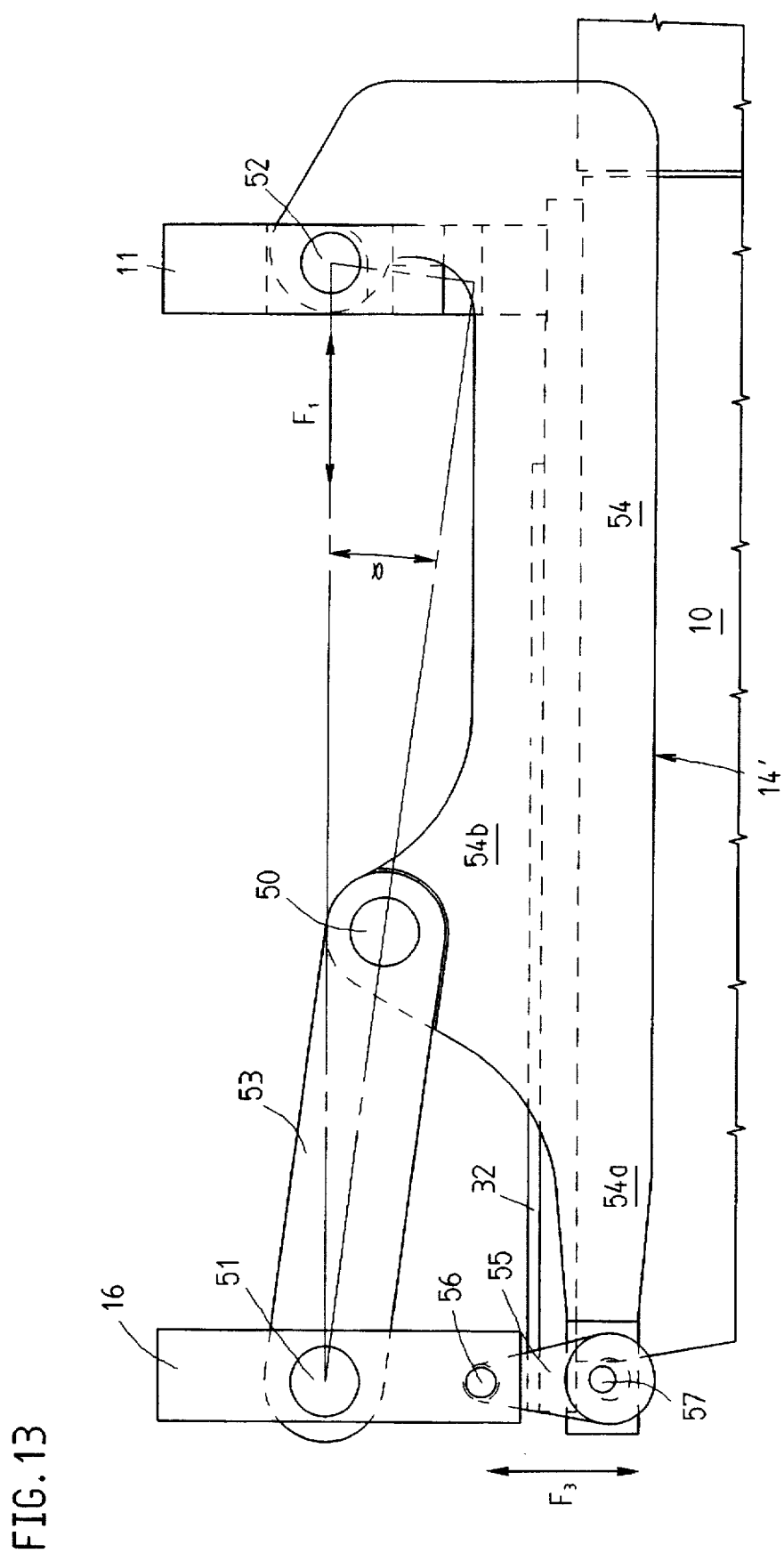
FIG. 13 is a view illustrating the schematic building-up of the clamping means in a representation according to FIG. 8.

An explanation for this results from FIG. 13. The bracket 53 is inclined in an angle α opposite to the closing direction in a direction towards the claw-shaped element and a normal force is originated along the straining line of the bracket 53, which is split up into the closing force $F_1$ and the operating force $F_3$ according to the formula $$F_1 = F_3 \times (\cos \alpha / \sin \alpha)$$

The smaller the angle α, the less force has to be generated in order to generate the closing force $F_1$.

The fixing method of the driving device A does not permit transmission of deformations to the machine base. Also referring to FIGS. 11 and 12, the driving device A is connected via a stud 56 at the supporting element 16. The stud is provided with a connection bracket 55, which at its other end is penetrated by an eccentric shaft 57. According to FIGS. 10–12, the claw-shaped piece 54 of the clamping means is also supported via the eccentric shaft 57. According to FIG. 11 an eccentric bearing 63 is fixed on the eccentric shaft by tensioning means 65, which is in contact with the connection bracket 55 via the ball bearing 64. If the eccentric shaft 57 is actuated by the eccentric drive 58, in FIG. 8 a force that acts towards the bottom is originated, which pushes down the end section 54a and at the same time generates the closing force. According to the extent the eccentric is actuated a closing force regulation can be effected, for example if the eccentric is not completely actuated. Bearing surfaces 66 provided between the connection bracket 55 and the end section 54a of the claw-shaped piece cover the outside of the bearing 64.

The eccentric drive 58 of the driving device is fixed at a moments support 62, which together with the claw-shaped pieces and the stationary mold carrier 11 constitutes a force frame.

According to FIG. 8, the hinge bolt 51 for coupling the bracket 53 at the supporting element 16, the stud 56 for coupling the connection bracket 55 at the supporting element 16, and the eccentric shaft 57 lie in one plane e—e, so that at least in the region where the force for generating the closing force is introduced, namely in the end section 54a, nearly no moment load is originated. In order to form the force flux evenly, it is also possible to split the bracket according to FIG. 9 for reception of the hump-shaped forming 54b of the claw-shaped piece 54. The bracket and the hump-shaped forming 54b of the claw-shaped piece 54 of the clamping means 14' are penetrated by the connecting pin 50 in the splitting area 53a. The bracket graduates into the splitting area passing a transition region 53b, and can be a single piece or composed by two oppositely bent elements. This fork-like form makes possible a symmetric force introduction of the high normal force occuring in the bracket 53 into the claw-shaped piece 54, increasing the life of the whole system. The hump-shaped forming 54b extends nearly into the plane of the axes of the hinge bolts 51,52, with the angle α being reduced in its course.

A similar symmetric force introduction is also provided in the region of the supporting element 16 and the stationary mold carrier 11 (FIGS. 14 and 15). The supporting element 16 and the stationary mold carrier 11 are provided with recesses 11a, 16a into which the clamping means 14' immerges. In this position the pieces of the clamping means are fixed by hinge bolts 51,52, which can be fitted perpendicularly to the recesses 11a,16a and which are supported at the walls 11b of the stationary mold carrier 11 and the supporting element 16, respectively. This way a regular force introduction is largely obtained without a bending load of the supporting element and the stationary mold carrier. However, in order to guarantee a durable force introduction and bearing, additional, easily exchangeable bearings 67, as in the first embodiment, are provided.

In case a mold height adjustment to smaller injection mold dimensions should also be desired for the third embodiment, it can also be taken into account in this arrangement by replacing the bracket correspondingly by a bracket with another length and besides by modifying the end section using washer pieces. Since the force which acts in this end section 54a(FIGS. 12 and 13) is relatively low, this is possible without problems.

Regulation and adjustment of the plate parallelism in all embodiments can be made easier by provision of two threaded spindles in the area of the closing device, which allow an adjustment by turning them slightly. It is also possible to modify the mold height this way. As soon as the clamping means 14,14' in the embodiments does not constitute a rigid frame anymore, it is actively used for the force generation. However, it not only takes over the function of the force generation, but also allows a reduction of the forces to be generated by utilizing lever principles.

Alternatively to the embodiments of the clamping means represented it is also conceivable to lengthen the lever arm of the element 14b arranged in the closing direction until, under the injection molding unit or to lay the arm of the element 14a arranged in the closing direction under the injection molding unit instead, and to generate there the closing force in a reversed direction of the arrow in FIG. 4 by a driving device.

What is claimed is:
1. An injection molding machine, comprising:
   (a) a machine base;
   (b) a stationary mold carrier fixedly connected with said machine base;
   (c) a movable mold carrier displaceably mounted on said machine base for movements towards and away from said stationary mold carrier to assume open and closed positions with respect to said stationary mold carrier; said movable mold carrier and said stationary mold carrier defining therebetween a mold clamping space;
   (d) force-exerting means connected to said movable mold carrier for moving said movable mold carrier into and out of said closed position and for applying a clamping force to said movable mold carrier in said closed position thereof for urging said movable mold carrier against said stationary mold carrier;
   (e) a supporting element displaceably mounted on said machine base for supporting at least one part of said force-exerting means; and
   (f) force take-up means for receiving forces and deformations occurring when said movable mold carrier is in said closed position and said force-exerting means applies said clamping force; said force take-up means comprising
      (1) a first individual component being jointedly connected to said stationary mold carrier at a first coupling point; and
      (2) a second individual component being jointedly connected to said supporting element at a second coupling point; said first and second individual components being directly articulated to one another at least one connecting point located at an essentially fixed distance from the first and second coupling points; said first and second individual components being void of a force-transmitting connection with said machine base for isolating said machine base from forces taken up by said force take-up means.

2. The injection molding machine defined in claim 1, wherein said one connecting point constitutes a first connecting point; and wherein said first and second individual components are detachably connected with each other at a second connecting point; said first and second individual components being pivotable relative to each other about the first connecting point when the second connecting point is detached.

3. The injection molding machine defined in claim 1, further comprising a connecting pin connecting said first and second individual pieces together at the connecting point; wherein said first and second individual components are pivotable relative to each other about a swiveling axis extending through said connecting pin.

4. The injection molding machine defined in claim 1, further comprising a first hinge bolt jointedly connecting said first individual component to said stationary mold carrier at the first coupling point, and a second hinge bolt jointedly connecting said second individual component to said supporting element at the second coupling point; wherein said supporting element and said stationary mold carrier each have a recess formed therein in a region of the respective coupling point, each recess being defined by at least two opposing walls; said first individual component projecting into the recess of said stationary mold carrier, and being fixed therein using said first hinge bolt, said first hinge bolt extending perpendicularly to the recess and being supported by the opposing walls of said stationary mold carrier; said second individual component projecting into the recess of said supporting element and being fixed therein using said second hinge bolt, said second hinge bolt extending perpendicularly to the recess and being supported by the opposing walls of said supporting element.

5. The injection molding machine defined in claim 1, further comprising a first joint assembly jointedly connecting said first individual component to said stationary mold carrier at the first coupling point, and a second joint assembly jointedly connecting said second individual component to said supporting element at the second coupling point; said first and second joint assemblies each comprising a plurality of detachable components.

6. The injection molding machine defined in claim 5, further comprising at least one washer piece inserted between at least one of the joint assemblies and the associated individual component to change a distance between said stationary mold carrier and said movable mold carrier.

7. The injection molding machine defined in claim 5, further comprising at least one washer piece inserted between said first joint assembly and said stationary mold carrier to change a distance between said stationary mold carrier and said movable mold carrier.

8. The injection molding machine defined in claim 5, further comprising at least one washer piece inserted between said second joint assembly and said supporting element to change a distance between said stationary mold carrier and said movable mold carrier.

9. The injection molding machine as defined in claim 1, wherein said first individual component has a first end portion jointed to said stationary mold carrier at said first coupling point; further wherein said first individual component has a second end portion being spaced from said first end portion; said connecting point being located on said first individual component between said first and second end portions thereof; further comprising driving means for pivoting, in said closed position of said movable mold carrier, said first individual component about said first coupling point to exert a pulling force on said supporting element by said second individual component at said second coupling point; said driving means forming part of said force-exerting means and said pulling force constituting clamping force.

10. The injection molding machine as defined in claim 9, wherein said driving means is connected to said second end portion of said first individual component and to said supporting element.

11. The injection molding machine defined in claim 10, wherein said driving means comprises a shaft eccentrically mounted to said second end portion of said first individual component; a connection bracket jointed to said supporting element and said shaft; and a drive for rotating said shaft eccentrically to pivot said first individual component about said first coupling point.

12. The injection molding machine defined in claim 11, further comprising a hinge bolt jointedly connecting said second individual component to said supporting element at the second coupling point and a stud attaching said connection bracket to said supporting element; said hinge bolt, said stud, and said shaft being arranged in one plane.

13. The injection molding machine defined in claim 9, wherein said second individual component has a forked portion having two prongs, each prong extending on a respective side of said first individual component in a region of the connecting point; further comprising a connecting pin penetrating a first one of the prongs, said first individual component, and a second one of the prongs, respectively, at the connecting point.

14. The injection molding machine defined in claim 9, wherein said first individual component has a humped portion projecting toward a horizontal plane extending through the first and second coupling points; further comprising a connecting pin penetrating said second individual component and the humped portion at the connecting point.

15. An injection molding machine, comprising:
  (a) a machine base;
  (b) a stationary mold carrier fixedly connected with said machine base;
  (c) a movable mold carrier displaceably mounted on said machine base for movements towards and away from said stationary mold carrier to assume open and closed positions with respect to said stationary mold carrier; said movable mold carrier and said stationary mold carrier defining therebetween a mold clamping space;
  (d) force-exerting means connected to said movable mold carrier for moving said movable mold carrier into and out of said closed position and for applying a clamping force to said movable mold carrier in said closed position thereof for urging said movable mold carrier against said stationary mold carrier;
  (e) a supporting element displaceably mounted on said machine base for supporting at least one part of said force-exerting means; and
  (f) force take-up means for receiving forces and deformations occurring when said movable mold carrier is in said closed position and said force-exerting means applies said clamping force; said force take-up means comprising
    (1) a first individual component being jointedly connected to said stationary mold carrier at a first coupling point; and
    (2) a second individual component being jointedly connected to said supporting element at a second coupling point; and
    (3) a third individual component being jointed to said first and second individual components at respective locations situated at fixed distances from the first and second coupling points, respectively; said first, second and third individual components being void of a force-transmitting connection with said machine base for isolating said machine base from forces taken up by said force take-up means.

16. The injection molding machine as defined in claim 15, further comprising a driving device connected to said third individual component for shifting, in said closed position of said movable mold carrier, said third individual component to simultaneously pivot said first and second individual components in opposite directions about said first and second coupling points, respectively, to exert a pushing force on said supporting element by said second individual component at said second coupling point; said driving device forming part of said force-exerting means and said pushing force constituting said clamping force.

17. The injection molding machine as defined in claim 16, further comprising a spindle rotatably connected to said driving device and being connected to said third individual component for shifting said third individual component by said spindle upon rotation thereof.

18. The injection molding machine as defined in claim 17, further comprising a fourth individual component connected to said first and second individual components; said driving device being supported on said fourth individual component.

19. The injection molding machine defined in claim 15, further comprising a first hinge bolt jointedly connecting said first individual component to said stationary mold carrier at the first coupling point, and a second hinge bolt jointedly connecting said second individual component to said supporting element at the second coupling point; wherein said supporting element and said stationary mold carrier each have a recess formed therein in a region of the respective coupling point, each recess being defined by at least two opposing walls; said first individual component projecting into the recess of said stationary mold carrier, and being fixed therein using said first hinge bolt, said first hinge bolt extending perpendicularly to the recess and being supported by the opposing walls of said stationary mold carrier; said second individual component projecting into the recess of said supporting element and being fixed therein using said second hinge bolt, said second hinge bolt extending perpendicularly to the recess and being supported by the opposing walls of said supporting element.

20. The injection molding machine defined in claim 15, further comprising a first joint assembly jointedly connecting said first individual component to said stationary mold carrier at the first coupling point, and a second joint assembly jointedly connecting said second individual component to said supporting element at the second coupling point; said first and second joint assemblies each comprising a plurality of detachable components.

21. The injection molding machine defined in claim 20, further comprising at least one washer piece inserted between at least one of the joint assemblies and the associated individual component to change a distance between said stationary mold carrier and said movable mold carrier.

22. The injection molding machine defined in claim 20, further comprising at least one washer piece inserted between one of said stationary mold carrier and said supporting element, and the associated joint assembly, to change a distance between said stationary mold carrier and said movable mold carrier.

* * * * *